United States Patent [19]
Eller et al.

[11] Patent Number: 5,377,440
[45] Date of Patent: Jan. 3, 1995

[54] FLAME STARTING UNIT FOR A COMBUSTION DEVICE

[75] Inventors: Martin Eller, Ludwigsburg; Odd Peters, Bietigheim-Bissingen, Germany

[73] Assignee: Beru Ruprecht GmbH & Co. KG, Ludwigsburg, Germany

[21] Appl. No.: 172,215

[22] Filed: Dec. 23, 1993

[30] Foreign Application Priority Data

Dec. 23, 1992 [DE] Germany ............... 4243959

[51] Int. Cl.6 ............ F02B 77/08; F02N 17/047; F02P 19/02
[52] U.S. Cl. ............ 431/11; 123/556; 123/550
[58] Field of Search ............ 123/179.21, 179.6, 556, 123/550; 431/66, 18, 25, 11, 70, 71, 207, 90

[56] References Cited
U.S. PATENT DOCUMENTS

| | | | |
|---|---|---|---|
| 3,602,206 | 8/1971 | Kern et al. | 123/179.21 |
| 4,120,273 | 10/1978 | Krause et al. | 123/179.21 |
| 4,431,401 | 2/1984 | Kunst et al. | 431/11 |
| 4,770,627 | 9/1988 | Yoshino | 431/18 |
| 4,862,370 | 8/1989 | Arnold et al. | 123/179.21 |
| 5,050,571 | 9/1991 | Daniels | 123/556 |
| 5,195,885 | 3/1993 | Medina | 431/25 |
| 5,216,990 | 6/1993 | Moosmann et al. | 123/179.21 |

*Primary Examiner*—Tony M. Argenbright
*Assistant Examiner*—M. Macy
*Attorney, Agent, or Firm*—Sixbey, Friedman, Leedom & Ferguson

[57] ABSTRACT

Flame starting unit for a combustion device, especially an internal combustion engine, for preheating the combustion air. A flame glow plug is placed in the combustion air duct of the combustion device and is supplied with fuel and current by a control device. The functioning of the flame starting unit is monitored by a monitoring device, which displays occurring malfunctions.

15 Claims, 4 Drawing Sheets

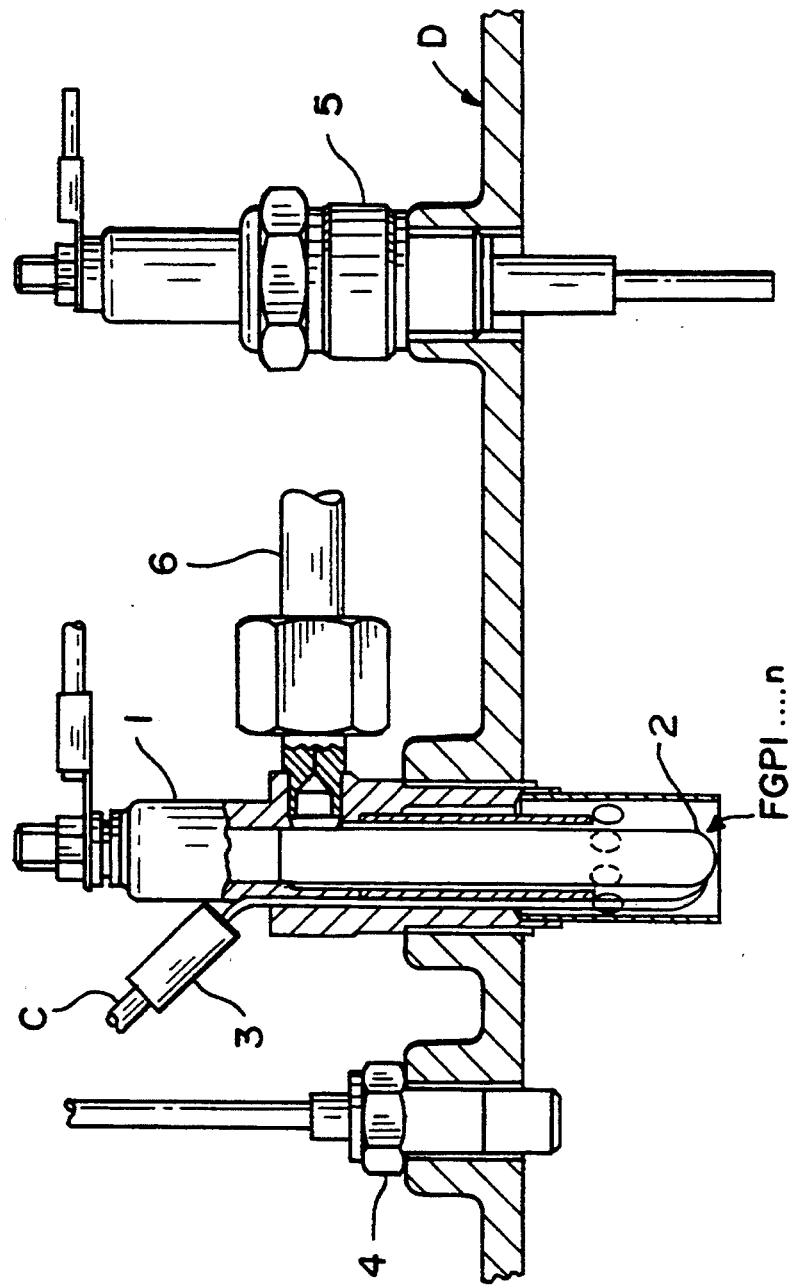

FLAME STARTING UNIT FOR A COMBUSTION DEVICE

BACKGROUND OF THE INVENTION

1. Field of the Invention

The invention relates to a flame starting unit for a combustion device, especially for preheating the combustion air supplied to an internal combustion engine, having a flame glow plug, which is placed in the air intake duct of the combustion device, fuel and current supply devices for the flame glow plug and a control or regulating device to control or regulate the fuel and current supply of the flame glow plug.

2. Background of the Invention

A flame starting unit, of the type to which the invention is directed, is used especially to make possible cold starting of internal combustion engines such as, for example, diesel engines, Otto engines, methanol and ethanol engines, with or without boost air, as well as evaporating burners. Such a unit is used especially with diesel engines, such as, for example, directly injecting diesel engines for truck use, to assure a reliable starting of the engine at low temperatures of, for example, below −10° C.

However, to make possible a reliable starting of a combustion device equipped with such a flame starting unit, especially an internal combustion engine, it is necessary for the flame starting unit to operate flawlessly. In the previously known flame starting units, errors in their functioning lead to the flame starting unit failing as an ignition aid, and therefore, starting at low outside temperatures is not possible.

SUMMARY OF THE INVENTION

The primary object of the present invention is, therefore, to provide a flame starting unit, of the initially mentioned type, with which reliable functioning can always be assured.

This object is achieved, according to the invention, through the provision of a monitoring device which monitors the functioning of the flame starting unit and indicates occurring malfunctions.

The flame starting unit according to the invention is thus designed so that it is monitored for satisfactory functioning and is subjected to a functional control to make possible a reliable starting of the combustion device, especially of a related internal combustion engine, and optionally, to introduce suitable measures when a malfunction is detected and displayed in time.

These and further objects, features and advantages of the present invention will become apparent from the following description when taken in connection with the accompanying drawings which, for purposes of illustration only, show a single embodiment in accordance with the present invention.

BRIEF DESCRIPTION OF THE DRAWINGS

FIG. 2 is a partial sectional side view of the arrangement of the flame glow plug and the monitoring sensors in the embodiment represented in FIG. 1.

DETAILED DESCRIPTION OF THE PREFERRED EMBODIMENT

Figure 1:
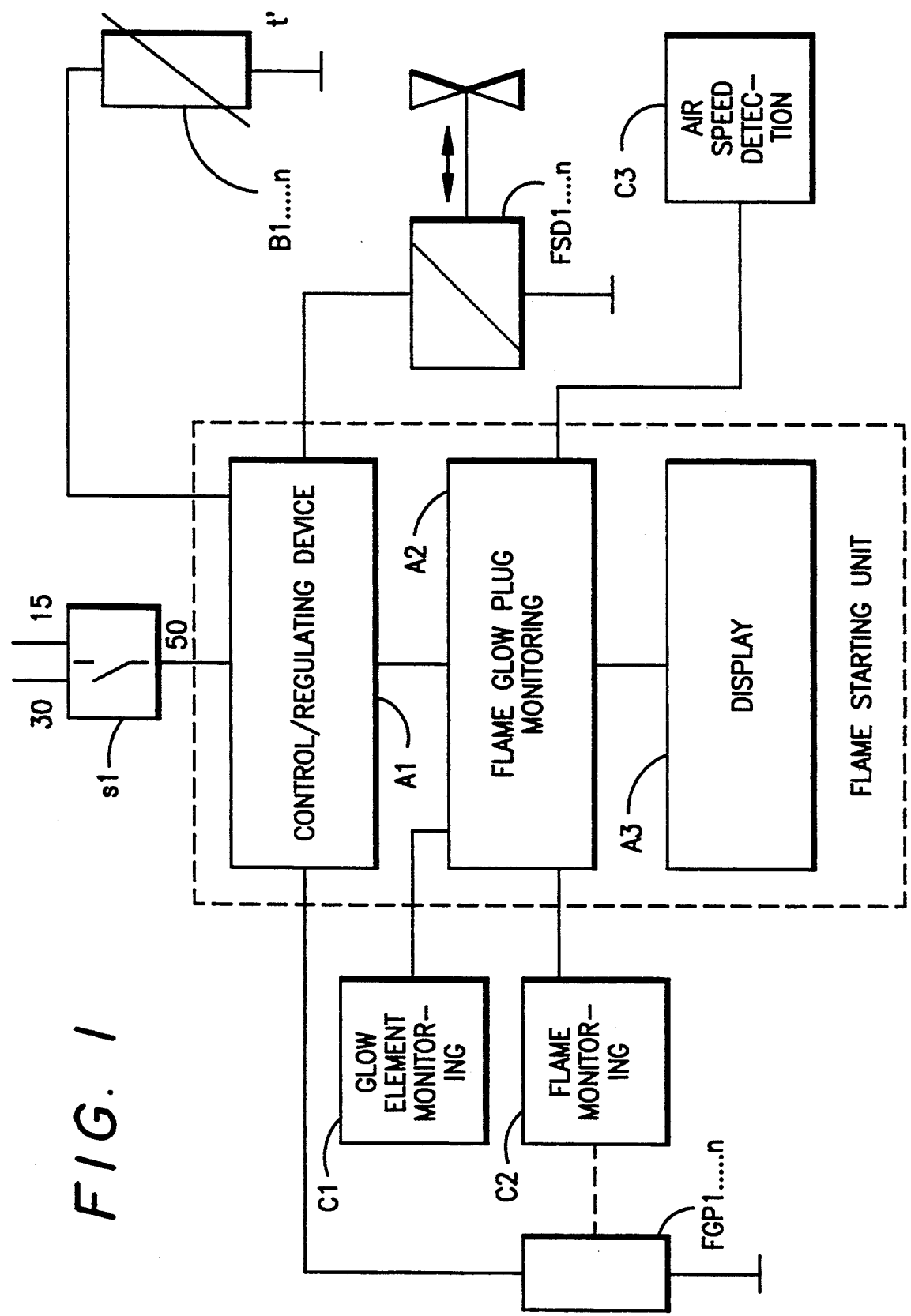
FIG. 1 is a schematic diagram of an embodiment of the flame starting unit according to the invention.

The flame starting unit of the present invention, as represented FIG. 1, comprises at least one flame glow plug FGP1 . . . n, which, as represented in FIG. 2, is located in an air intake duct D of a combustion device, especially an internal combustion, a current supply device S1 and fuel supply device(s) FSD1 . . . n for the flame glow plug(s) FGP1 . . . n, and a control device A1, by which the fuel and current supply of flame glow plug(s) FGP1 . . . n is controlled.

A control device A1 is connected with a monitoring device A2, to which the output signals of a glow element monitoring sensor C1 and a flame monitoring sensor C2 are delivered. Monitoring device A2 is connected with a display unit A3 to display the monitoring result. The display can be, e.g., a light signal or a display panel.

An air speed sensor C3 is further provided, which determines the air speed or the air throughput in the air intake duct D and sends corresponding signal to monitoring device A2, which thereupon operates control device A1 so that flame glow plug(s) FGP1 . . . n are supplied with a fuel volume which corresponds to the air speed or air volume in the air intake duct D. Temperature sensors B1 . . . n are used to determine the outside temperature or the coolant temperature, and are connected with control device A1.

If electrical energy supply S1 is turned on by closing the switch, for example the ignition lock switch, in the flame starting unit represented in FIG. 1, then control device A1 of the unit is activated. The coolant temperature or the ambient air temperature is interrogated by temperature sensors B1 . . . n, and if this temperature falls below a certain value, control device A1 supplies the glow elements of flame glow plugs FGP1 . . . n with current.

In recent years, the requirements on flame starting units have continuously increased. While previously such units were used only at low ambient temperatures of, for example, −10° C. in directly injecting diesel engines until the start of the internal combustion engine, and preheating had to be done for up to 60 seconds, before the flame glow plug could be ignited, the aim is now to use flame starting units each time that the internal combustion engine is started, and a preheating of the flame glow plug is to be achieved in a short time of, for example, less than 10 seconds, and the flame starting unit is also to be in operation when the engine is running, i.e., for up to about 8 minutes after ignition. Also, in this after-ignition operation, i.e., in the case of a running engine, the operating conditions of the flame glow plugs are to be controlled or regulated so that a flame blow-off or a failure of the flame glow plugs, for example, by overheating of the glow or heating element, is avoided.

The reason for this broadening of the operational range of flame starting units lies in the tightening of the legal regulations relative to the purity of the exhaust gases. Flame starting units, thus, are used to reduce the pollutant content of the exhaust gas after an internal combustion engine has been started.

The temperature sensors B1 . . . n used to interrogate the coolant temperature and/or ambient temperature, may be temperature-dependent resistances with positive or negative temperature coefficients. If control device A1 detects a cold-operation engine, for example, a coolant temperature below 60° C. as well as an ambient temperature of, for example, below 20° C., then, the glow elements of the flame glow plugs FGP1 ... n are connected, for example, by semiconductor switching elements so as to be supplied with current.

If the flame starting unit is to be used each time that the engine is started, the measurement of the cooling-water temperature and/or ambient temperature can be dispensed with.

The function of the flame glow plug, especially of its glow element or heating rod, is controlled by glow element monitoring sensor C1. As soon as glow element monitoring sensor C1 has detected a correct functioning of the glow element, fuel supply device FSD1 ... n (fuel feed pump) is turned on. Preferably, with a plunger-type pump, the amount of fuel supplied is dependent on the stroke frequency of its activation, and a constant fuel volume per combustion stroke is pumped and the stroke frequency is regulated by air speed sensor C3, i.e., by the air speed of the flow prevailing in the air intake duct. Continuously pumping fuel pumps with corresponding activation are also usable.

The ignition and the flame are controlled by flame monitoring sensor C2. In monitoring device A2, the incoming sensor signals are logically linked, so that, in the case of occurring malfunctions or failures of a flame glow plug FGP1 ... n detected by sensor C2, the latter can be displayed on display A3. In the case of nonignition of a flame glow plug FGP1 ... n, a repeated start can also be introduced by control device A1, if no malfunctions are detected. The detected malfunctions are optically displayed on display A3 and/or are stored in an error memory, which can be read out.

In FIG. 2, a flame glow plug 1 (which can be any one of plugs FGP1 ... n) as well as a mineral-insulated metal-sheathed thermoelement 3 serving as a glow element monitoring sensor and an ionization electrode 5 serving as a flame monitoring sensor are represented in detail.

Glow element 2 of flame glow plug 1, e.g., is made of a ceramic heating rod and preferably of a glow tube made of a material free of scale, filled with an insulating material, e.g., MgO, in which at least one heating coil with a high specific resistance, that does not change significantly with changes in temperature (at most 3 to 5%), as well as at least one regulating coil, made of a material with a positive temperature coefficient that jumps sharply with increases in temperature, are embedded. The heating coil sits in the tip of the heating rod, while the regulating coil is connected in series to the heating coil. Such glow elements are known per se.

The monitoring of the glow element is possible by a detection of the temperature of the glow element, for which there are several possibilities. One possibility consists in the providing thermoelements, which are integrated into the flame glow plug. For this purpose, especially mineral-insulated metal-sheathed thermoelements are suitable, which are embedded in a sheath made of a material free of scale. These mineral-insulated metal-sheathed thermoelements should be attached to an advantageous point of the glow element, i.e., to the hottest point, and have no electrical contact with the glow element. A good heat contact with the glow element should be assured. This can be achieved by a weld joint of the sheath of the mineral-insulated metal-sheathed thermoelement on the glow tube of the glow element.

An example of such a mineral-insulated metal-sheathed thermoelement 3 is represented in FIG. 2. Thermoelement 3 is guided toward the rear through the body of flame glow plug 1 and is connected by a cable C with control device A1.

In the case of glow elements which have heating and regulating coils, in which the regulating coil is connected in series to the heating coil and has a positive temperature coefficient (e.g., of nickel, iron, CoFe), the temperature of the glow element can also be inferred by a resistance measurement. In this case, both the total resistance and the individual resistances are interrogated, e.g., by reading the welding point between the regulating coil and the heating coil, and the course of resistance of the regulating coil is recorded.

The glow element is originally heated with an on-period of 100%. If no temperature increase by the thermoelement 3 or by a resistance measurement can be determined within a certain period of time, e.g., 10 seconds, a failure of the glow element is inferred. As soon as it is determined that the actual temperature is equal to the desired temperature, the glow element is supplied with current, synchronized and a regulating to the desired temperature takes place according to a P-, PI-, PID-, two-point or multipoint control algorithm. In this case, the timing ratio is between 0 and 100% of the on-period.

A control would also be possible, in which the pulse to no-current ratio can be changed in stages and greater temperature differences are allowed relative to the desired temperature. However, the glow element must not be acted on with heating outputs which lead to the destruction of the heating or regulating coils. This can be the case especially if the heating rod is outwardly greatly cooled by strong air intake movements, for example, in the running of an engine or by nonignited fuel. As a result, thermoelement 3, which is welded outside on the glow tube, will display too low a temperature and endeavor to counteract with an increase of the timing ratio. This entails an increase of the heating power. Simultaneously, the resistance value of the regulating coil with positive temperature coefficient will decline and allow an increased current flow through the heating and regulating coils. As a result, the coil resistance decreases. Since the heat transmission resistance, the heating power of the embedding insulation and of the glow tube, cannot conduct any big heat volumes per time unit toward the outside to the glow tube wall, the danger of an overheating, especially of the heating coil of the flame glow plug, exists. The heating power is therefore limited to a maximum value, in which the heating and regulating coils cannot be damaged.

After reaching the desired temperature, which is sufficient to ignite the fuel, the fuel supply is turned on by control device A1. In this connection, the necessary fuel volume is calculated on the basis of an air volume measurement.

The control of the ignition and the flame of the flame glow plug takes place by flame monitoring sensor C1. Ionization electrodes 5 which can display an ignition can serve as flame monitoring sensor C1. Such ionization electrodes can be integrated either in flame glow plug(s) FGP1 ... n or can be installed in the suction section of the internal combustion engine, as represented in FIG. 2. If the ionization electrodes 5 are installed in the suction section at a distance from flame glow plugs FGP1 ... n, which corresponds to the minimum flame width with optimal combustion of the air-fuel mixture, then a statement can be made on the state of flame glow plugs FGP1 . . . n, since with poor mixture formation, this minimum flame width is not reached.

As flame monitoring sensors, bimetallic strips, which trigger electric contacts when heated by the flame, also sensor elements with positive and negative temperature coefficients, are suitable, whose resistance value depends on the temperature. Thermoelements, which display the temperature increase by the flame, as well as optical sensors, which react to the light action of the flame, can also be used.

An example of a flame monitoring sensor in the form of an ionization electrode 5 is represented in detail in FIG. 2. Ionization electrode 5 is applied at a selected distance from flame glow plug 1 in the suction section of the internal combustion engine. It indicates to control device A1 whether a sufficient flame formation occurs. As mentioned, the distance of ionization electrode 5 from flame glow plug 1 should be selected so that it corresponds to the minimum flame width. In the extreme case, if the flame burns only inside the flame glow plug, then it can also be useful to provide the ionization electrode directly integrated in the flame glow plug.

The flame detection takes place to shift a flame blow-off, especially at higher air speeds in the running of an engine up to the highest possible load point and revolution point. At increasing air speed, the flame width is narrowed because of the high air excess. This can be counteracted in that the fuel supply can be increased to match the air volume and analogously, the current supply of the flame glow plug. If a flame blow-off develops, nevertheless, suitable measures are taken by the control device to initiate an immediate new ignition. For this purpose, the glow temperature is interrogated by the thermoelement to increase the heating power, in the case of too low a temperature because of the cooling by cold blowing at higher air speeds or by unevaporated fuel, until a sufficient ignition temperature is reached. It can also be advantageous, at times, not to supply any fuel, to facilitate the heating. Then, the fuel pump is turned on to supply fuel, via line 6, to flame glow plug 1 corresponding to the signal of air sensor 4, which may be an air pressure sensor, until ionization electrode 5 gives off a flame signal.

If, after a preset period of time, the flame signal fails to be produced, then an error message appears and a new start is made, in which the temperature state of the heating rod is taken into consideration, so that the heating rod of the flame glow plug is not overheated. In display A3, errors occurring are either displayed by lamp signals or stored in an error memory to be read out in a routine inspection. In this connection, a differentiation is made between errors which relate to the functioning of the flame glow plug and errors which can occur in operation because of outside influences and represent malfunctions. In the case of a detected failure of a flame glow plug, thermoelement 3 does not detect any temperature increase by the glow element, so that the flame starting unit is turned off and this error is displayed, e.g., by a corresponding acoustical or optical signal.

Figure 3A:
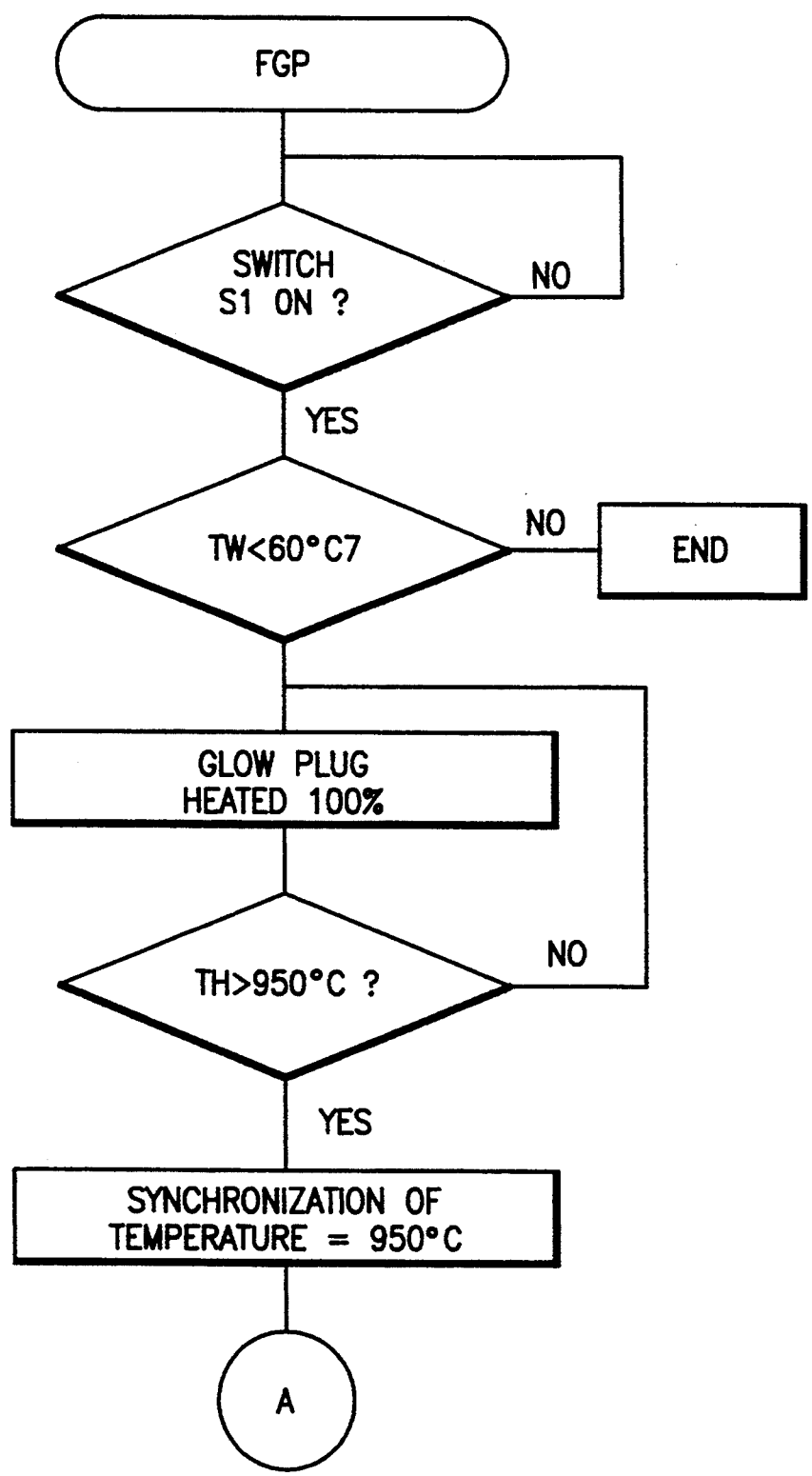
FIGS. 3a and 3b are respective portions of a flow chart of the operating sequence of the flame starting unit represented in FIG. I.
Figure 3B:
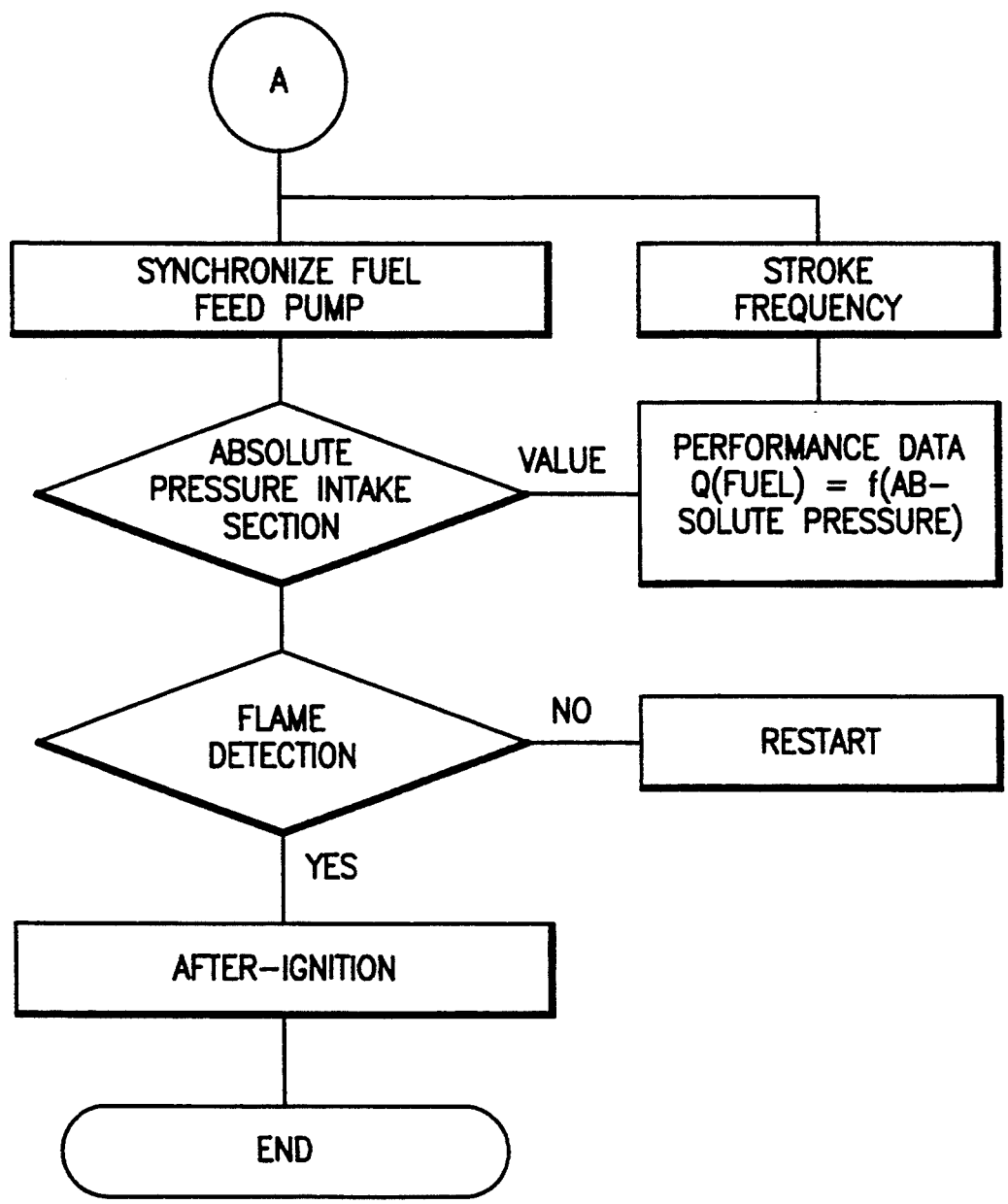

In FIG. 3a and 3b, the above-mentioned operating sequence is represented in the form of a logical flow diagram.

FIG. 3a shows that, after turning on switch S1, it is determined whether the operating temperature, detected by temperature sensors B1 . . . n, is below 60° C.

If this is the case, a heating of the glow element FGP takes place with an on-period of 100%, until the ignition temperature of the flame glow plug of, e.g., 950° C. is reached. Then, the flame glow plug is supplied with current, synchronized and regulated to a temperature equal to 950° C.

FIG. 3b shows the synchronization of the fuel feed pump as a function of the absolute pressure in the intake section by a corresponding control of stroke frequency, which is determined according to stored fuel-absolute pressure performance data. A negative flame detection results in a repeat start while, with a positive result, the control is changed from an ignition mode of operation to an after-ignition mode of operation.

In the flame starting unit according to the invention, a functional control thus takes place, which comprises a functional control of the glow element and flame detection. As a result, it is possible to determine changes over the entire service life of the flame starting unit before they result in a start failure of the internal combustion engine or can cause damage. Such changes are displayed if they exceed or fall short of certain limits. Corresponding measures can also be taken independently by the related electronic control, which can exist, for example, in an automatic repeat start.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Flame starting unit for a combustion device for preheating combustion air, comprising a flame glow plug located in an air intake duct of the combustion device, fuel and current supply devices for supplying fuel and electrical current to the flame glow plug, a control device for controlling supplying of fuel and current to the flame glow plug by the fuel and current supply devices, and a monitoring device which is operative to monitor the functioning of the flame starting unit and to indicate occurring functional errors, said flame starting unit further comprising a flame monitoring sensor which forms a means for monitoring the formation of a flame by the flame glow plug, said flame monitoring sensor producing a corresponding signal which is delivered to the monitoring device.

2. Flame starting unit according to claim 1, wherein the flame glow plug comprises a heating rod which contains heating and regulating coils connected in series, heating rod temperature being determined from at least one of regulating coil resistance and heating coil resistance and being indicated to the monitoring device.

3. Flame starting unit according to claim 1, further comprising a glow element monitoring sensor, said glow element monitoring sensor forming a means for monitoring the temperature of a glow element of the flame glow plug and producing a glow plug temperature output signal indicative thereof, said glow plug temperature output signal being delivered to the monitoring device.

4. Flame starting unit according to claim 3, wherein the glow element monitoring sensor is a mineral-insulated metal-sheathed thermoelement which is welded to a glow tube of the flame glow plug.

5. Flame starting unit according to claim 3, further comprising a flame monitoring sensor which forms a means for monitoring the formation of a flame by the flame glow plug, said flame monitoring sensor producing a corresponding signal which is delivered to the monitoring device.

6. Flame starting unit according to claim 5, wherein the flame monitoring sensor is an ionization electrode.

7. Flame starting unit according to claim 6, wherein the ionization electrode is placed at a distance from flame glow plug in a suction section of the combustion device.

8. Flame starting unit according to claim 5, wherein the flame monitoring sensor is integrated into the flame glow plug.

9. Flame starting unit according to claim 1, wherein the flame monitoring sensor is an ionization electrode.

10. Flame starting unit according to claim 9, wherein ionization electrode is placed at a distance from flame glow plug in a suction section of the combustion device.

11. Flame starting unit according to claim 1, wherein the flame monitoring sensor is integrated into the flame glow plug.

12. Flame starting unit according to claim 1, wherein the monitoring device comprises means for triggering a repeated initiation of ignition by the control device if flame formation fails to be detected by said flame monitoring sensor after a predetermined period of time.

13. Flame starting unit according to claim 1, wherein monitoring device has means for displaying error messages on a display.

14. Flame starting unit according to claim 1, wherein the monitoring device has means for storing error messages in a memory.

15. Flame starting unit according to claim 14, wherein said monitoring device is operative to logically link sensor signals, with at least one of certain limiting values and each other, in the error message.

* * * * *